(12) United States Patent
Rhynard et al.

(10) Patent No.: US 11,780,584 B2
(45) Date of Patent: Oct. 10, 2023

(54) PANEL ATTACHMENT IN A VEHICLE CONFIGURED FOR LOW PROFILE REMOVAL AND REATTACHMENT

(71) Applicant: The Boeing Company, Chicago, IL (US)

(72) Inventors: Steven Ellis Rhynard, Mukilteo, WA (US); Joe Files, Arlington, WA (US)

(73) Assignee: THE BOEING COMPANY, Arlington, VA (US)

( * ) Notice: Subject to any disclaimer, the term of this patent is extended or adjusted under 35 U.S.C. 154(b) by 53 days.

(21) Appl. No.: 17/527,493

(22) Filed: Nov. 16, 2021

(65) Prior Publication Data

US 2023/0150673 A1  May 18, 2023

(51) Int. Cl.
*B64D 11/00* (2006.01)
*B64C 7/00* (2006.01)

(52) U.S. Cl.
CPC .............. *B64D 11/003* (2013.01); *B64C 7/00* (2013.01)

(58) Field of Classification Search
CPC  B64D 11/003; B64C 7/00; B64C 1/14; B64C 1/32
See application file for complete search history.

(56) References Cited

U.S. PATENT DOCUMENTS

| | | | |
|---|---|---|---|
| 3,603,636 A * | 9/1971 | Carella | B60J 7/19 296/218 |
| 5,441,218 A | 8/1995 | Mueller et al. | |
| 5,456,529 A | 10/1995 | Cheung | |
| 6,290,175 B1 * | 9/2001 | Hart | B64D 11/003 244/118.1 |
| 7,802,826 B2 | 9/2010 | Schmitz et al. | |
| 8,665,119 B2 | 3/2014 | Hashberger et al. | |
| 8,876,050 B2 | 11/2014 | Wentland et al. | |
| 9,745,064 B2 | 8/2017 | Balasubramanian | |
| 2003/0141414 A1 | 7/2003 | Itakura et al. | |
| 2005/0029832 A1 * | 2/2005 | Verduci | B60J 7/1621 296/100.06 |
| 2007/0064964 A1 | 3/2007 | Cheung | |
| 2008/0078871 A1 | 4/2008 | Munson et al. | |
| 2009/0243329 A1 * | 10/2009 | Hustyi | B60J 1/1846 296/76 |
| 2013/0290221 A1 | 10/2013 | Jindel | |

(Continued)

FOREIGN PATENT DOCUMENTS

WO  2017178078 A1  10/2017

*Primary Examiner* — Rodney A Bonnette
(74) *Attorney, Agent, or Firm* — COATS & BENNETT, PLLC (57) ABSTRACT

An assembly configured to be mounted within an interior of a vehicle. The assembly includes a monument wall configured to be mounted in the interior of the vehicle. A panel is configured to attach to a support structure above the monument wall with the panel having a first edge and a second edge. A latch configured to be mounted to the panel between the first edge and the second edge. A pull member is attached to the panel and comprises an elongated member attached to the latch and a handle. A translating hinge is configured to be mounted to the second edge of the panel to provide for translating and pivoting movement of the panel within an access area between the monument wall and the support structure to connect and disconnect the panel from the support structure.

20 Claims, 11 Drawing Sheets

(56) References Cited

U.S. PATENT DOCUMENTS

| | | |
|---|---|---|
| 2017/0058561 A1 | 3/2017 | Terry et al. |
| 2017/0283060 A1 | 10/2017 | Papke et al. |
| 2018/0179786 A1 | 6/2018 | Johnson |
| 2020/0269983 A1 | 8/2020 | Berkenhoff et al. |
| 2020/0339276 A1 | 10/2020 | Chengalva |
| 2021/0229794 A1* | 7/2021 | Vayssiere ............. B64C 1/1407 |

* cited by examiner

PANEL ATTACHMENT IN A VEHICLE CONFIGURED FOR LOW PROFILE REMOVAL AND REATTACHMENT

TECHNOLOGICAL FIELD

The present disclosure relates generally to the field of panels and, more specifically, to a panel configured to have a limited movement range to connect and disconnect with a support structure.

BACKGROUND

Vehicles such as aircraft include panels that are connected to support structures at walls and ceilings within an interior space. The panels function to cover various components, such as but not limited to electrical components, electrical wiring, HVAC equipment, personal service unit equipment (e.g., emergency air system, lighting fixtures), and computer software equipment. In addition, the panels can also provide for an aesthetically pleasing appearance such that when positioned in the cabin area of the vehicle or other location where passengers are located.

The components that are covered by the panels may require periodic service. For example, various work is performed on the electrical components during maintenance work on the vehicle. This requires the panels to be disconnected from the support structure to allow for a technician to access the components. The panels should be mounted in a manner in which the technician can disconnect the panels in a straight-forward manner. Likewise, when the work on the components is completed, the panels should be configured to be re-connected to the support structure and repositioned to extend over the components.

As issue with some vehicles is the panels are located at wall monuments that are mounted within the interior space of the vehicle. For example, a wall that separates adjacent passenger compartments may extend up to the ceiling in the interior space and be positioned in close proximity to a panel that is mounted to the ceiling. Thus, the panels should be configured to be connected to the support structure in a manner in which they can be disconnected within the small space and allow access to the components. Similarly, the panels should be configured to be moved in the small space and re-connected to the support structure when the work on the components is completed.

SUMMARY

One aspect is directed to an assembly configured to be mounted within an interior of a vehicle. The assembly comprises a monument wall configured to be mounted in the interior of the vehicle. A panel is configured to attach to a support structure above the monument wall with the panel comprising a first edge and a second edge. A latch is mounted to the panel between the first edge and the second edge. A pull member is attached to the panel and comprises an elongated member attached to the latch and a handle positioned on the elongated member and positioned in proximity to the first edge of the panel. A translating hinge is configured to be mounted to the second edge of the panel to provide for translating and pivoting movement of the panel within an access area between the monument wall and the support structure to connect and disconnect the panel from the support structure.

In another aspect, the panel comprises an inward face and an outward face with each of the latch, the pull member, and the translating hinge positioned on the inward face.

In another aspect, the pull member is movable relative to the latch to move the latch from an engaged position that is secured to the support structure and a released position that is released from the support structure.

In another aspect, the handle of the pull member is positioned within an envelope defined by a perimeter edge of the panel.

In another aspect, the translating hinge comprises: a mating bracket configured to mount to the support structure with the mating bracket comprising a slot; and a hinge bracket comprising a base configured to mount to the inward face of the panel and a neck that is spaced away from the base and configured to fit into the slot to provide for the translating and pivoting movement of the panel relative to the support structure.

In another aspect, the translating hinge is configured to pivot within a range of between about 0°-10°.

In another aspect, the access space comprises a height measured between the monument wall and the support structure and the panel comprises a height measured between an inboard edge and an outboard edge with the height of the access space smaller than the height of the panel.

One aspect is directed to an assembly configured to be mounted within an interior of a vehicle. The assembly comprises a monument wall configured to be mounted in the interior of the vehicle. A panel comprising an inward face is configured to face into the interior of the vehicle and an opposing outward face is configured to face into the support structure. The panel further comprises a perimeter edge that extends between the inward and outward faces. A latch is mounted to the inward face and spaced inward from the perimeter edge. A pull member is positioned on the inward face and comprises an elongated shape with a first end attached to the latch and a second end positioned at the perimeter edge of the panel. A translating hinge comprises: a mating bracket configured to mount to the support structure of the vehicle with the mating bracket comprising an opening; and a hinge bracket comprising a base configured to mount to the inward face of the panel and a neck that is spaced away from the base and configured to fit into the opening to provide for translational and pivoting movement of the panel within an access space formed between the monument wall and the support structure.

In another aspect, the neck comprises an exposed distal end and with the neck comprising a width that is less than a width of the slot to provide for the neck to fit into the slot and with the distal end positioned within the mating bracket.

In another aspect, the translating hinge is configured to pivot within a range of between about 0°-10° to maintain the outer face facing towards the monument wall during movement of the panel.

In another aspect, the mating bracket is a first mating bracket and the hinge bracket is a first hinge bracket and further comprising a second mating bracket and a second hinge bracket wherein the first mating bracket and the first hinge bracket are positioned at a first lateral side of the panel and the second mating bracket and the second hinge bracket are positioned at a second lateral side of the panel.

In another aspect, the second end of the pull member is positioned along an inboard edge of the panel and the hinge bracket is positioned along an opposing outboard edge of the panel.

In another aspect, the access space comprises a height measured between the monument wall and the support structure that is less than one-half a height of the panel measured between inboard and outboard edges.

One aspect is directed to a method of removing a panel from a support structure within an interior of a vehicle. The method comprises: applying a force to a handle of a pull member that is positioned on an inward face of the panel while the panel is connected by a latch and a translating hinge of the support structure; disengaging the latch from the support structure in response to applying the force to the handle and while the panel remains connected to the support structure at the translating hinge; pivoting the panel about the translating hinge and moving a first edge of the panel downward away from the support structure and towards a monument wall that is positioned in the interior of the vehicle; and after pivoting the panel, translating the panel along the monument wall in a direction towards the interior of the vehicle and away from the support structure.

In another aspect, the method further comprises pivoting the panel about the translating hinge that is positioned at a second edge of the panel.

In another aspect, the method further comprises translating the panel into the interior of the vehicle and disengaging a hinge bracket that is mounted to the panel from a mating bracket that is mounted to the support structure.

In another aspect, the method further comprises pivoting the panel about the translating hinge while a hinge bracket that is mounted to the panel is inserted within a mating bracket that is mounted to the support structure.

In another aspect, the method further comprises pivoting the panel about the second edge within a range of between 0°-10° Wand maintaining the panel spaced away from the monument wall.

In another aspect, the method further comprises while the latch is disengaged from the support structure and the panel remains attached with the translating hinge to the support structure, moving the panel away from the support structure and accessing an overhead storage space formed within an interior of the support structure.

In another aspect, applying the force to the handle of the pull member comprises pulling the handle in a direction away from the translating hinge.

The features, functions and advantages that have been discussed can be achieved independently in various aspects or may be combined in yet other aspects, further details of which can be seen with reference to the following description and the drawings.

DETAILED DESCRIPTION

Figure 1:
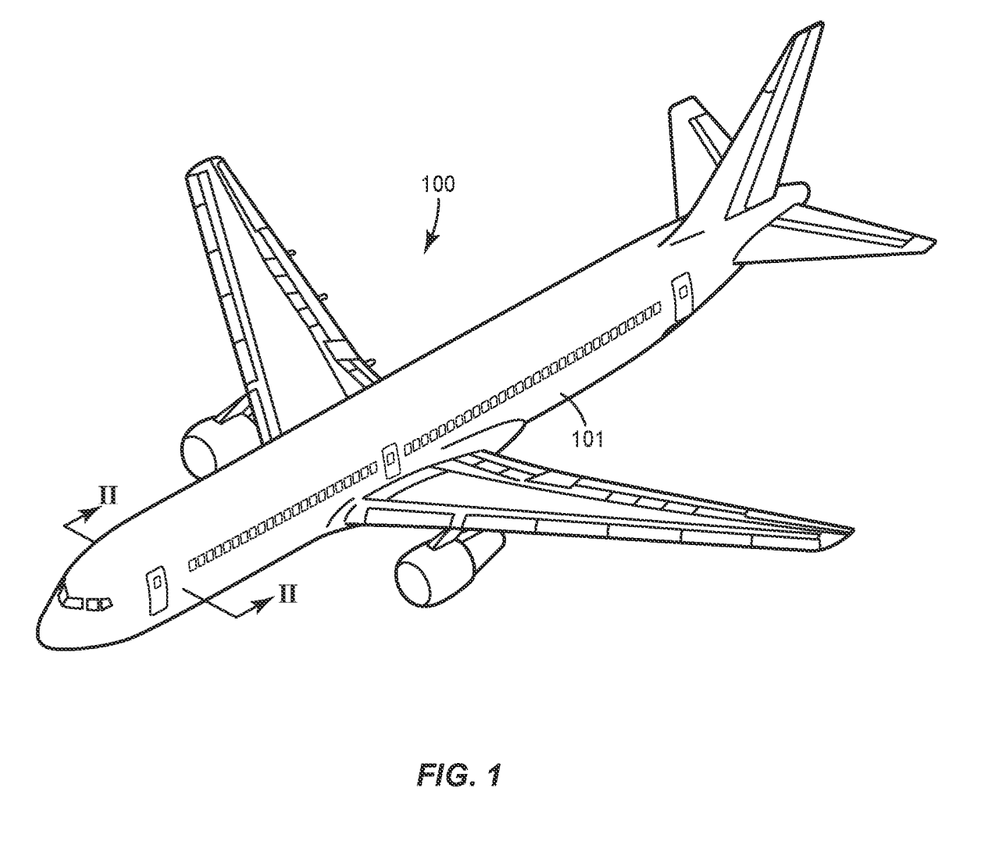
FIG. 1 is a perspective view of an aircraft.
Figure 2:
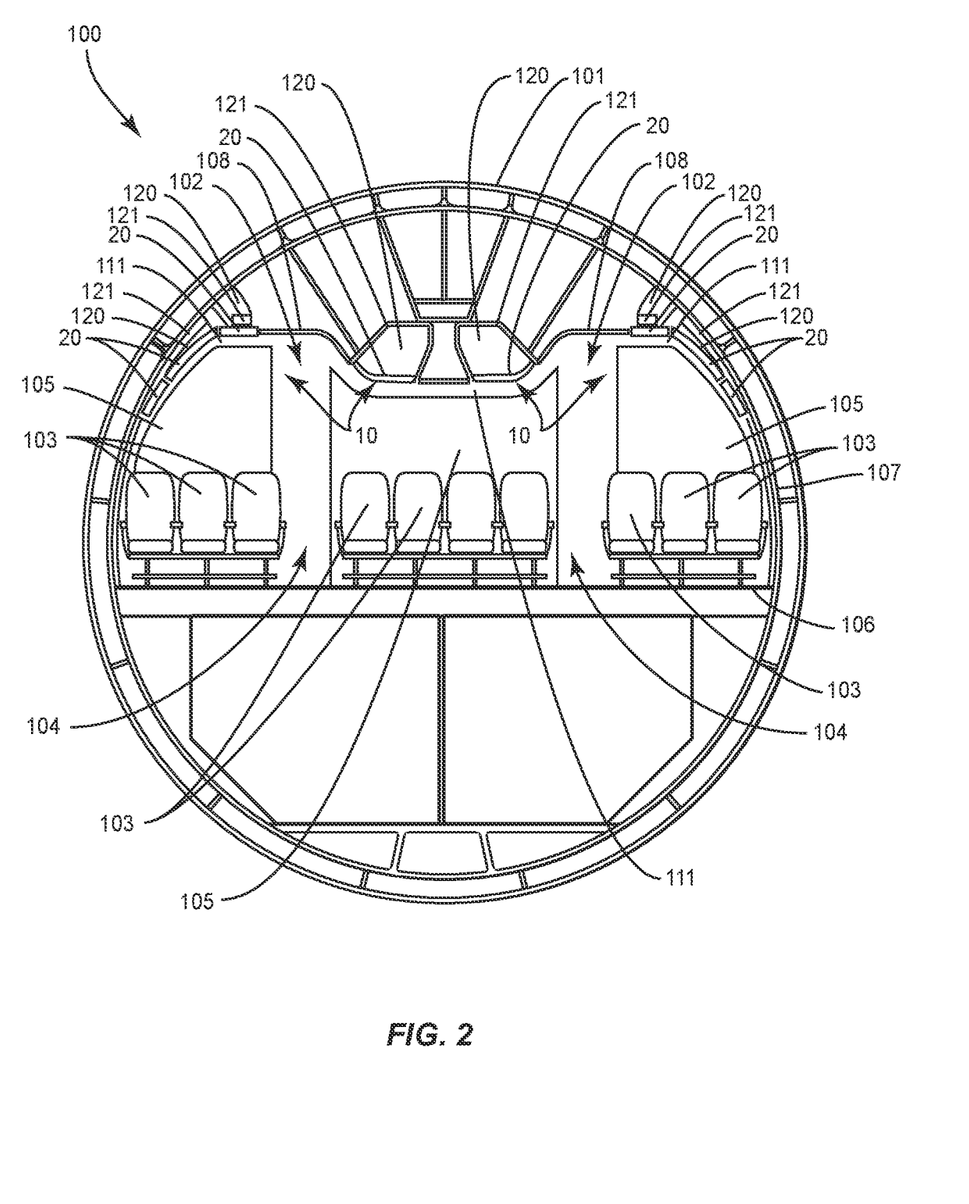
FIG. 2 is a schematic section view of a portion of the interior of the aircraft cut along line II-II of FIG. 1.

An assembly 10 that includes a panel 20 and the attachment components for mounting a panel 20 at a wall monument 105 can be used with a variety of different vehicles 100. One type of vehicle 100 is an aircraft 100 as illustrated in FIG. 1. The aircraft 100 includes a fuselage 101 configured to accommodate passengers and/or cargo. FIG. 2 illustrates a simplified version of a portion of the fuselage 101 that includes an interior space 102 configured to accommodate the passengers. The interior space 102 includes seats 103, aisles 104, and various other components for the passengers.

Monument walls 105 are fixedly mounted in the interior space 102. The monument walls 105 can be used in a variety of different structures, including but not limited to walls that separate different sections of the aircraft 100 or define a passenger space, storage closet for passenger cargo (e.g., jackets, briefcase, suitcase), equipment closet, lavatory, galley, attendant work station, and serving area. The monument walls 105 are attached to the structure of the aircraft 100, such as to one or more of the floor 106, walls 107, and ceiling 108. The attachment prevents the wall monuments 105 from moving within the interior space 102.

One or more panels 20 are positioned adjacent to the monument wall 105 as illustrated in FIG. 2. This can include the panel 20 positioned at various positions relative to the monument wall 105, including but not limited to vertically above the monument wall 105, and lateral to the monument wall 105. The panel 20 is positioned in front of a storage space 120 sized to house one or more functional components of the aircraft 100, including but not limited to various electrical components and wiring, air moving equipment and vents, personal service unit equipment, and computer components. The panel 20 is mounted to a support structure 121 to secure the panel 20 in position in front of these one or more components to prevent a passenger from access and also provide an aesthetically pleasing appearance. The panels 20 are further configured to be removed from the support structure 121 to provide access to the storage space 120, such as for a technician working on the aircraft 100.

Figure 3:
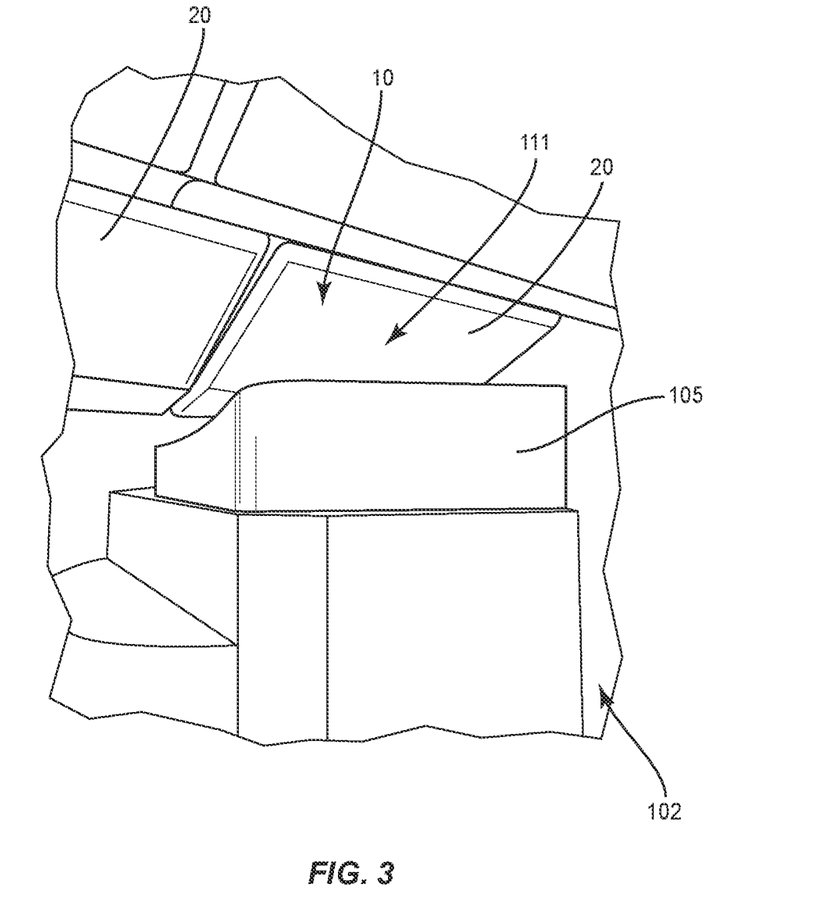
FIG. 3 is a perspective view of a panel positioned above a monument wall within an interior space of a vehicle.

As illustrated in FIGS. 2 and 3, the panel 20 is positioned in close proximity to the monument wall 105. A relatively small access space 111 is formed between the monument wall 105 and panel 20. The panel 20 is configured to be disconnected from the support structure 121 to provide access to the components in the storage space 120. The panel 20 is further configured to be re-connected and secured to the support structure 121 once the work is completed by the technician.

The panel assemblies 10 can be positioned at various locations in the interior space 102. As illustrated in FIG. 2, panel assemblies 10 can be positioned along one or both outboard sides of the interior space 102. Panel assemblies 10 can also be positioned along a central section of the interior space 102. The panels 20 of the various assemblies 10 can pivot in different directions dependent upon their position within the interior space 102 and their location relative to one or more of the monument walls 105.

Figure 3A:
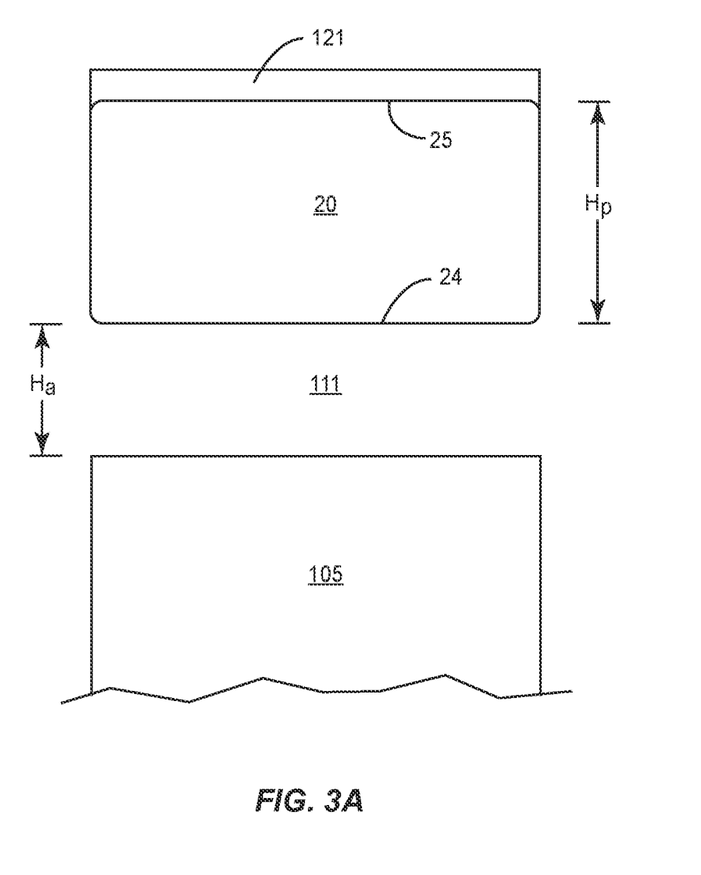
FIG. 3A is a schematic diagram of an access space formed between a monument wall and a panel.

FIG. 3A schematically illustrates the access space 111 having a height Ha formed between the monument wall 105 and the panel 20. The access space 111 is small relative to the panel 20. This reduced size complicates removal and reattachment of the panel 20 to and from the support structure 121. In one example, the access space height Ha is less than one-half (½) the height Hp of the panel 20. In another example, the access space height Ha is less than one-fourth (¼) the height Hp of the panel 20. In one example as illustrated in FIG. 3A, the access space 111 has a uniform height and length. Other examples include the access space 111 having varying dimensions across the height and/or width. In one example, the height Ha of the access space is about 2 inches.

The panel 20 is configured to be attached and detached to and from the support structure 121 within the relatively small access space 111. The panel 20 is configured to pivot and translate relative to the support structure 121 to provide for connection and disconnection. In one example, the panel 20 moves within the access space 111 without contacting against the monument wall 105.

The assembly 10 includes a panel 20, a latch 30, a pull member 40, and a translating hinge 50 that are positioned at a monument wall 105. When the panel 20 is fully connected to the support structure 121 as illustrated in FIG. 3, both the latch 30 and the translating hinge 50 are engaged to the support structure 121. In a partially connected orientation, the latch 30 is disengaged while the translating hinge 50 remains engaged with the support structure 121. This partially connected orientation provides for the panel 20 to pivot about the translating hinge 50 within the access space 111. This orientation also provides for the panel 20 to translate along the support structure 121 within the access space 111. In a fully disconnected orientation, both the latch 30 and the translating hinge 50 are disconnected from the support structure 121. The fully disconnected orientation provides for the panel 20 to be removed from the support structure 121 and the access space 111.

Figure 4:
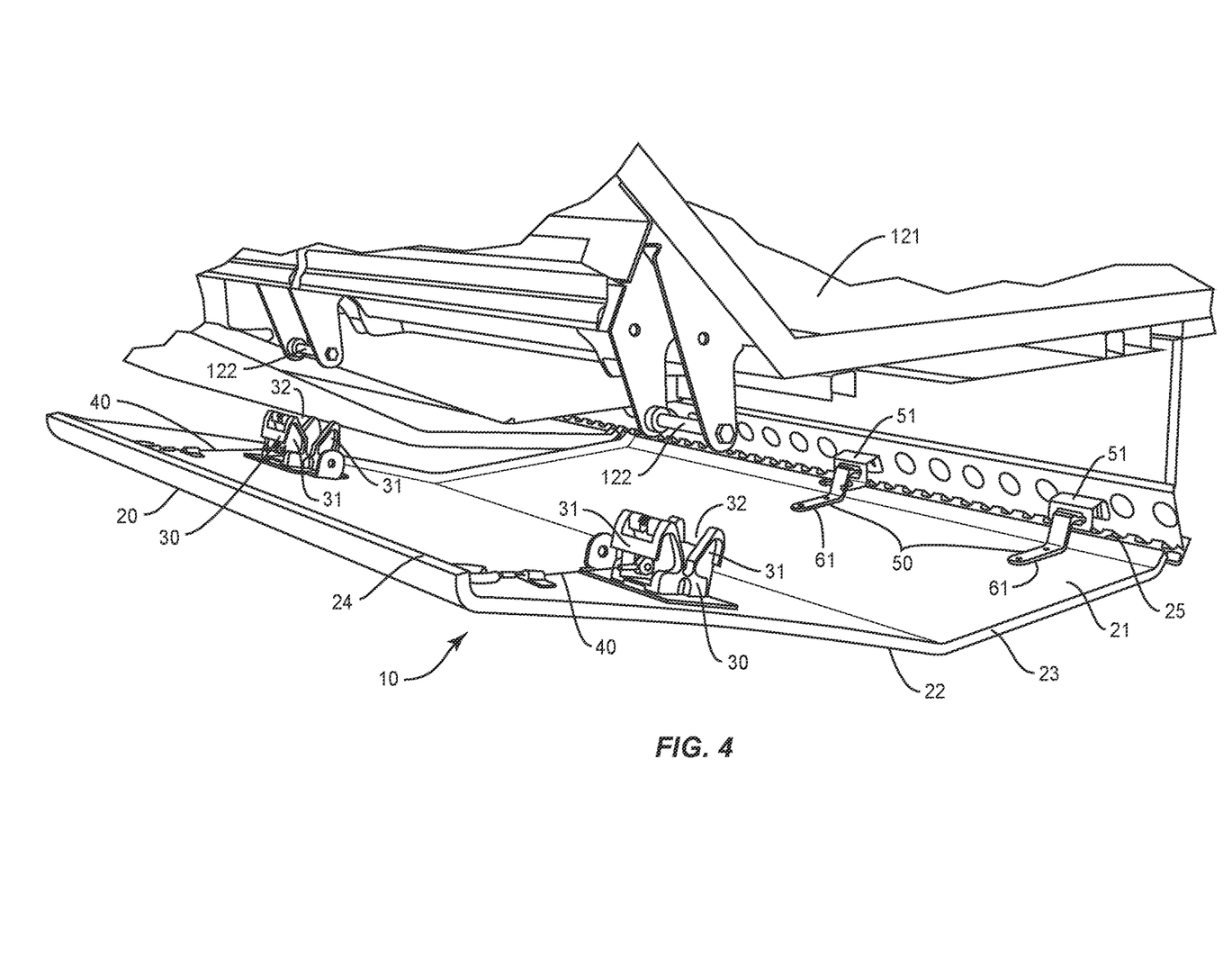
FIG. 4 is a perspective view of a panel in a partially disconnected orientation with a panel connected to an support structure through a translating hinge.
Figure 5:
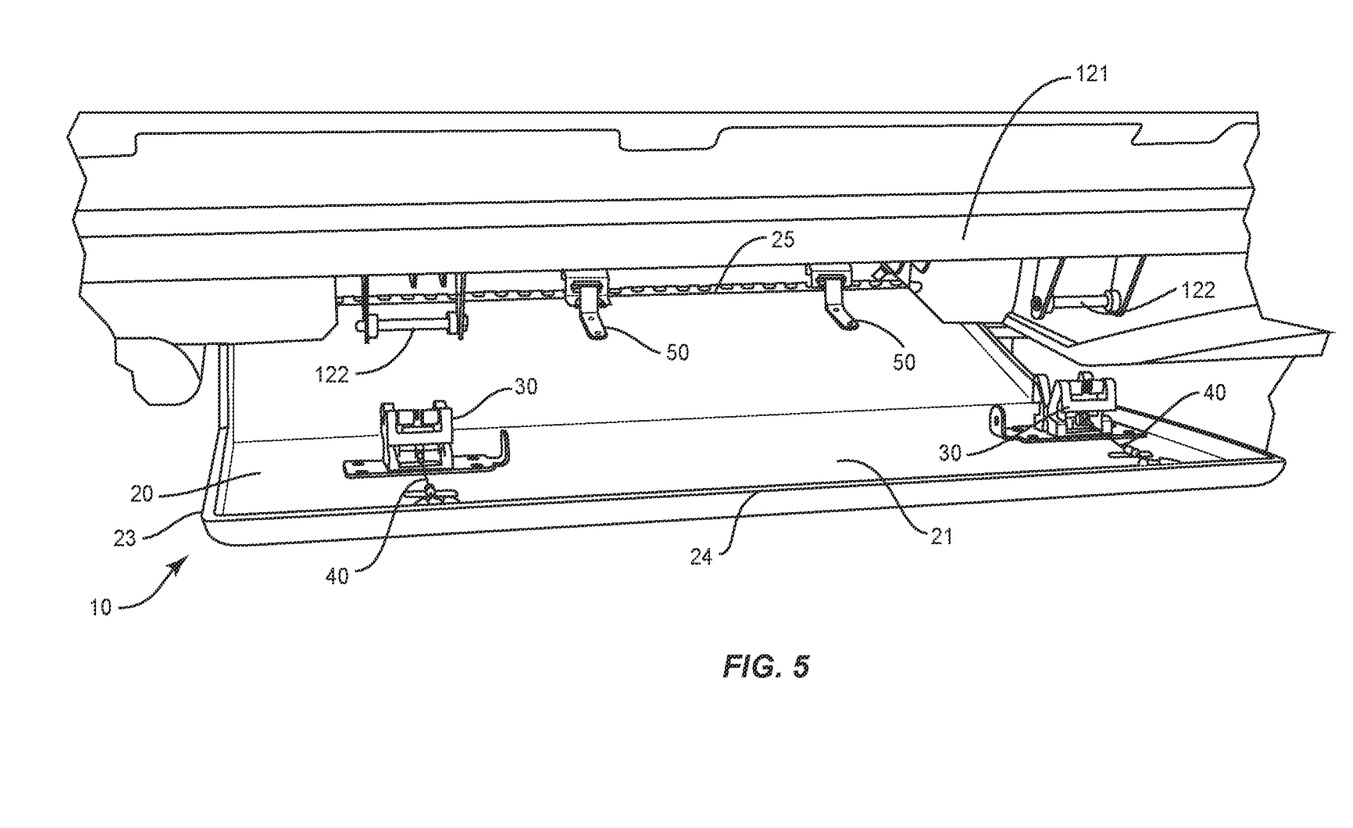
FIG. 5 is a perspective view of the panel of FIG. 4.

FIGS. 4 and 5 illustrate the panel 20 in a partially connected orientation. The latches 30 on the panel 20 are disconnected from the support structure 121. The panel 20 remains connected to the support structure 121 through the translating hinges 50. This provides for the panel 20 to pivot about the translating hinges 50 relative to the support structure 121. The translating hinges 50 provide for the panel 20 to remain connected to the support structure 121.

The assembly 10 in FIGS. 4 and 5 include a pair of latches 30 and a pair of translating hinges 50 attached to the panel 20. The latches 30 and translating hinges 50 are spaced apart across the inward face 21 of the panel 20. Other examples can include different numbers of latches 30 and translating hinges 50, including specific examples with a single latch 30 and a single translating hinge 50, and examples with three or more latches 30 and translating hinges 50. Further, the number of latches 30 and translating hinges 50 attached to the panel 20 can be the same or different.

The panel 20 has a plate-like shape with an inward face 21 and an outward face 22. The panel 20 includes a thickness measured between the inward and outward faces 21, 22. In one example, the thickness is about 0.375 inches. The outward face 22 faces outward into the interior space 102 of the aircraft 100 when mounted to the support structure 121. A perimeter edge 23 extends around the panel 20 and spans between the inward and outward faces 21, 22. The perimeter edge 23 includes an inboard edge 24 that is positioned towards a center of the vehicle 100 when mounted to the support structure 121 and an opposing outboard edge 25. When the panel 20 is fully mounted to the support structure 121, the outward face 22 is visible from within the interior space 102 of the aircraft 100 and the inward face 21 is not visible.

The panel 20 can include a variety of shapes and sizes. In one example, the panel 20 is substantially flat. Other examples as illustrated in FIGS. 4 and 5 include the panel 20 having an angular shape with one or more planar sections that abut at corners. The panel 20 can be used for various purposes within the vehicle 100. Examples include but are not limited to ceiling panels, lateral wall panels, and overhead bin panels.

The latch 30 is mounted to the inward face 21 of the panel 20. This position hides the latch 30 from view when the panel 20 is connected to the support structure 121. As illustrated in FIG. 4, the latch 30 includes a pair of jaws 31 that are spaced apart to form an opening 32. The jaws 31 are adjustable relative to each other between a locked position and an unlocked position. In the locked position, the jaws 31 are connected to a strike member 122 on the support structure 121.

In one example, one or both jaws 31 are pivotally mounted to the panel 20. The jaws 31 are biased by a biasing member towards the locked position. In one example, an over-center pawl maintains the locked position. A force applied to one or both jaws 31 moves the jaws 31 from the locked position to the unlocked position. In one example, the force simply overcomes the biasing force. In another example, the force causes the pawl to rotate thus moving one or both jaws 31 to the unlocked position.

The jaws 31 are further configured to return to the locked position when the panel assembly 10 is reconnected to the support structure 121. In one example, the shape of the surface of one or both jaws 31 contacts against and locks onto the strike member 122 when the jaws 31 are brought back into contact with the strike member 122.

Figure 6:
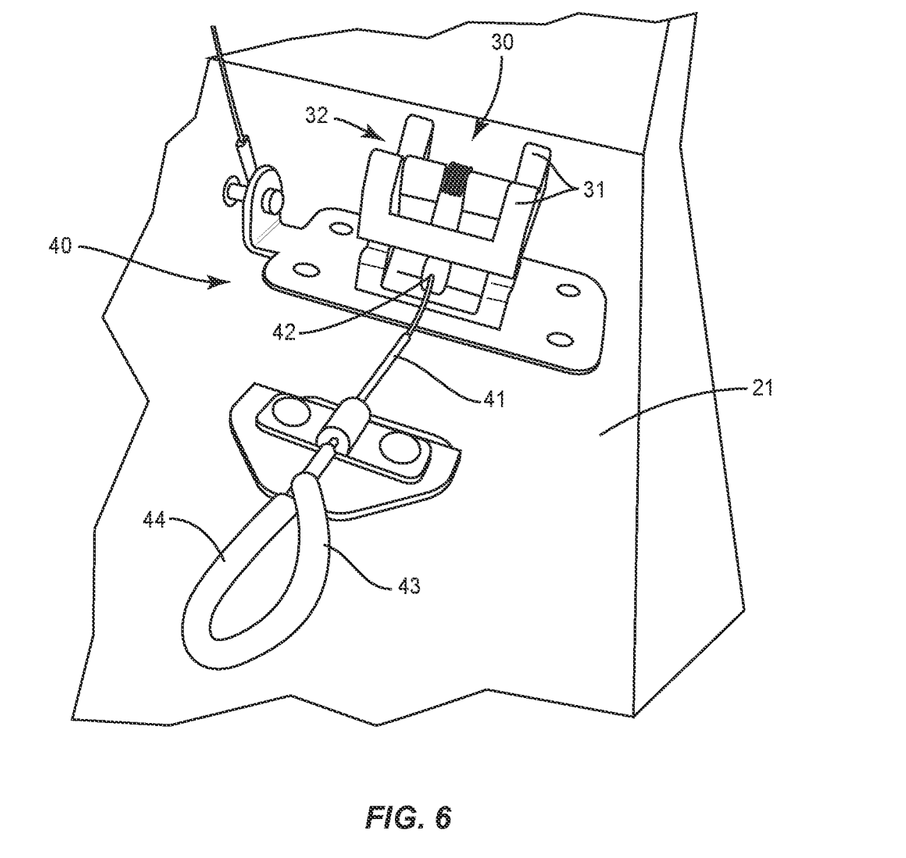
FIG. 6 is a perspective view of a pull member attached to a latch and mounted to an inward face of a panel.

A pull member 40 is positioned on the inward face 21 of the panel 20 and is configured to move the latch 30 from the locked position to the unlocked position. The pull member 40 includes elongated shape that extends between the perimeter edge 23 of the panel 20 and the latch 30. As illustrated in FIG. 6, the pull member 40 includes an elongated member 41, such as but not limited to a wire, cable, string, and chain that includes a first end 42 connected to the latch 30 and a second end 43 at the perimeter edge 23. In one example, the second end 43 includes a handle 44 positioned at the inboard edge 24 of the panel 20. This positioning hides the handle 44 from view within the interior space 102, but still provides access to a technician to actuate the pull member 40 and release the latch 30.

In another example, the jaws 31 are mounted to the support structure 121 and the strike members 122 are mounted to the panel 20. In this example, the jaws 31 engage with the strike members 122 in a similar manner when the panel 20 is in the locked position.

Figure 7:
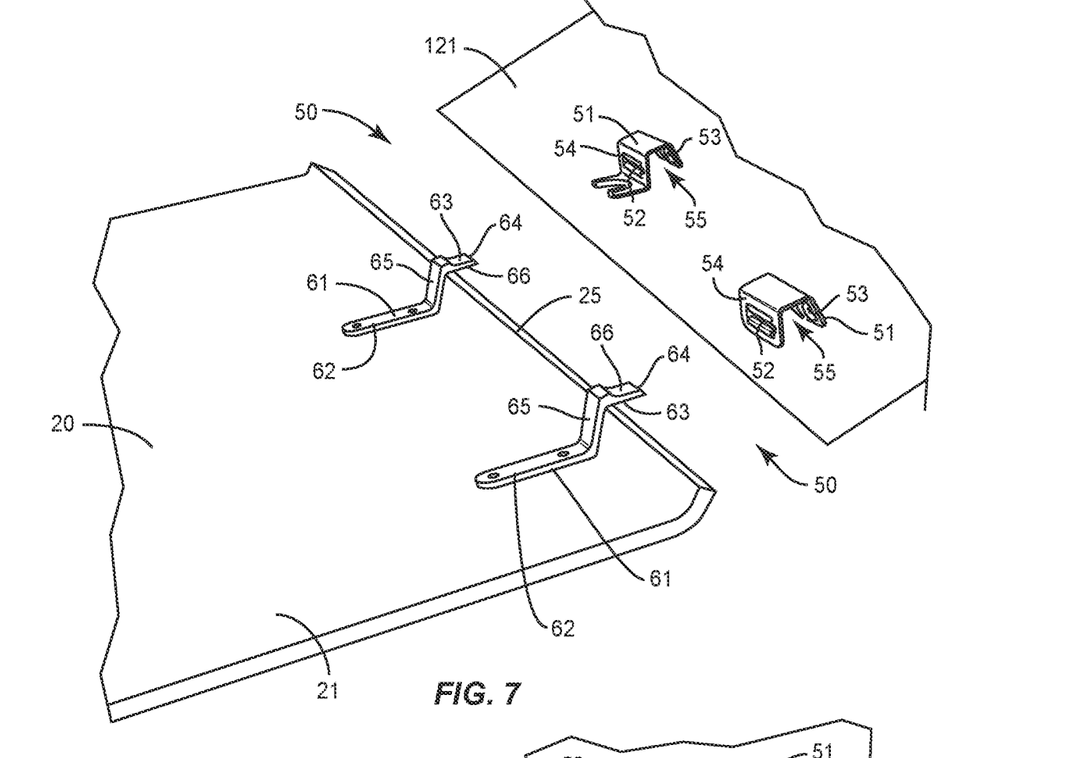
FIG. 7 is an exploded perspective view of a translating hinge positioned at a panel and an support structure.

The translating hinge 50 provides for rotational and translational movement of the panel 20 relative to the support structure 121. As illustrated in FIG. 7, the translating hinge 50 includes a mating bracket 51 and a hinge bracket 61. In the example of FIG. 7, the mating bracket 51 is mounted to the support structure 121 and the hinge bracket 61 is mounted to the panel 20. In other examples, this arrangement is reversed with the hinge bracket 61 mounted to the support structure 121 and the mating bracket 51 mounted to the panel 20.

Figure 8:
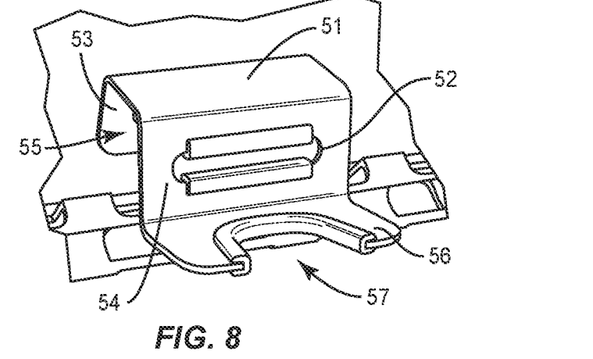
FIG. 8 is a perspective view of a mating bracket.
Figure 9:
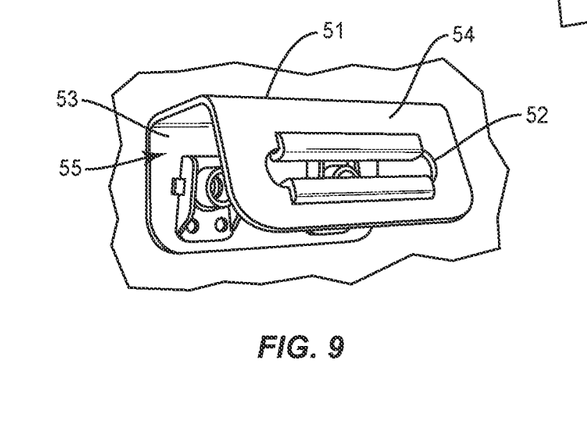
FIG. 9 is a perspective view of a mating bracket.

The mating bracket 51 includes a body with an opening 52. The mating bracket 51 can have various different structures including but not limited to being constructed from a piece of sheet metal and a machined block. In one example, as illustrated in FIG. 7, the mating bracket 51 includes a first section 53 and a second section 54. The first and second sections 53, 54 are spaced apart by a space 55. The first section 53 is configured to receive fasteners to mount the mating bracket 51. The second section 54 includes an opening 52 that is in communication with the space 55 and sized to receive the hinge bracket 61. In one example as illustrated in FIG. 8, the opening 52 includes an elongated shape that forms a slot. The opening 52 is configured for a low-friction interface with the hinge bracket 61 and can include a contact surface that can be coated or otherwise connected to the second section 54. The low friction interface can be formed from various materials, including but not limited to polytetrafluoroethylene (PTFE) and polyoxymethylene (POM).

In one example, an extension 56 extends outward from the second section 54. The extension 56 includes a receptacle 57 sized to receive the hinge bracket 61. The extension 56 can include a low-friction interface.

The hinge bracket 61 is configured to engage with the mating bracket 51. The hinge bracket 61 includes an elongated shape with a base 62 configured to connect to one of the panel 20 and support structure 121. In one example, the base 62 includes one or more openings to receive fasteners. A neck 63 extends outward from the base 62 and terminates at a distal end 64. In one example as illustrated in FIG. 7, the neck 63 includes a first section 65 that extends away from the base 62, and a second section 66 that extends outward from the first section 65. In one example, the base 62 and the second section 66 include centerlines that are substantially parallel. In another example, the hinge bracket 61 includes a block attached to the panel 20 and an engagement member attached to a top of the block and extending outward to engage with the opening 52 in the mating bracket 51.

The second section 66 of the neck 63 is sized to insert into the opening 52 of the mating bracket 51. This includes a width and height of the second section 66 being smaller than a width and height of the opening 52. In one example as illustrated in FIG. 7, the second section 66 has a ramped shape with the height increasing away from the distal end 64. The increasing height controls and extent the second section 66 can be inserted into the opening 52. When the second section 66 is inserted into the opening 52, one or both of the upper and lower sides of the second section 66 contact against the edges of the opening 52. When the mating bracket 51 includes an extension 56 as illustrated in FIG. 8, the first section 65 of the neck 63 seats in the neck 57 to position and support the hinge bracket 61.

In one example, the hinge bracket 61 fits into the receptacle 57 formed between the extensions 56. In a 9G event, this positioning provides for the hinge bracket 61 to bear into the mating bracket 51 to provide forward/aft support and for the extensions 56 to provide a structural load path.

In one example, the translating hinge 50 is configured to require the panel 20 to be pivoted away from the support structure 121 prior to disengaging the mating bracket 51 from the hinge bracket 61. This aligns the neck 63 of the hinge bracket 61 within the opening 52 of the mating bracket 51 and allows for the neck 63 to slide out of the opening 52. In one example with the panel 20 in the open position, the upper and lower edges of the neck 63 are parallel with the elongated edges of the opening 52. When the panel 20 is fully connected to the support structure 121 in the closed position, the neck 63 is oriented at an angle within the opening 52. This angular positioning prevents the panel 20 from sliding along the support structure 121 and for the mating bracket 51 to disengage from the hinge bracket 61. In one example when the panel 20 is in the closed position and connected to the support structure 121, the neck 63 of the hinge bracket 61 is pinched in the opening 52 of the mating bracket 51 as the neck 63 is positioned transverse to the opening 52. The neck 63 is trapped between an inner corner of the lower edge of the opening 52 and an outer corner of the upper edge of the opening 52. This pinched position assists to tighten down on the hinge side to keep it firmly in place and prevents and/or reduces rattle.

Figure 10:
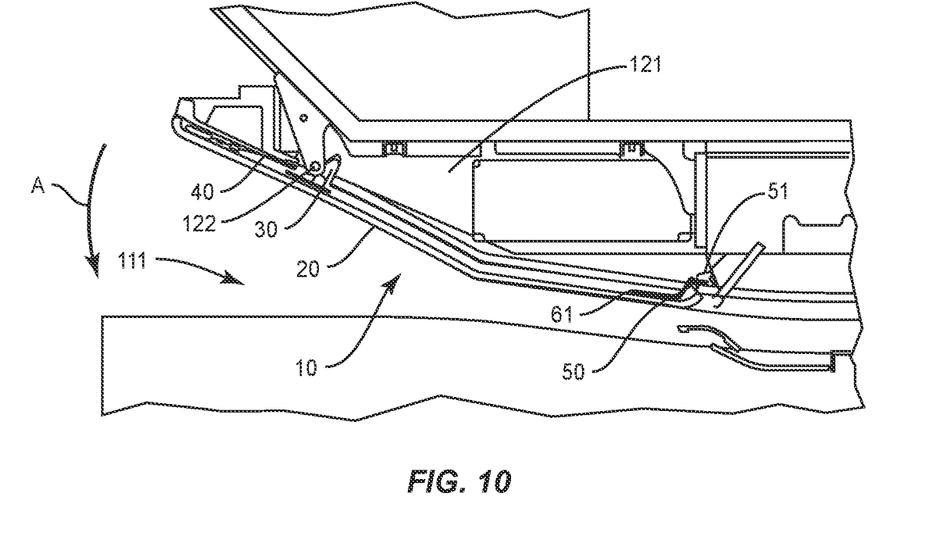
FIG. 10 is a side view of a panel fully connected to an support structure.
Figure 11:
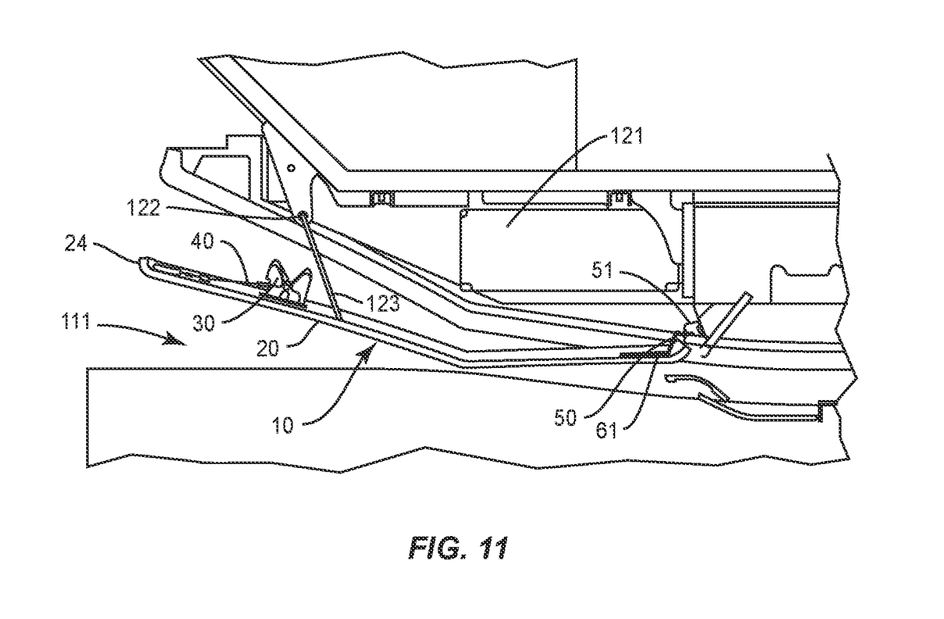
FIG. 11 is a side view of the panel of FIG. 10 in a partially connected orientation.
Figure 12:
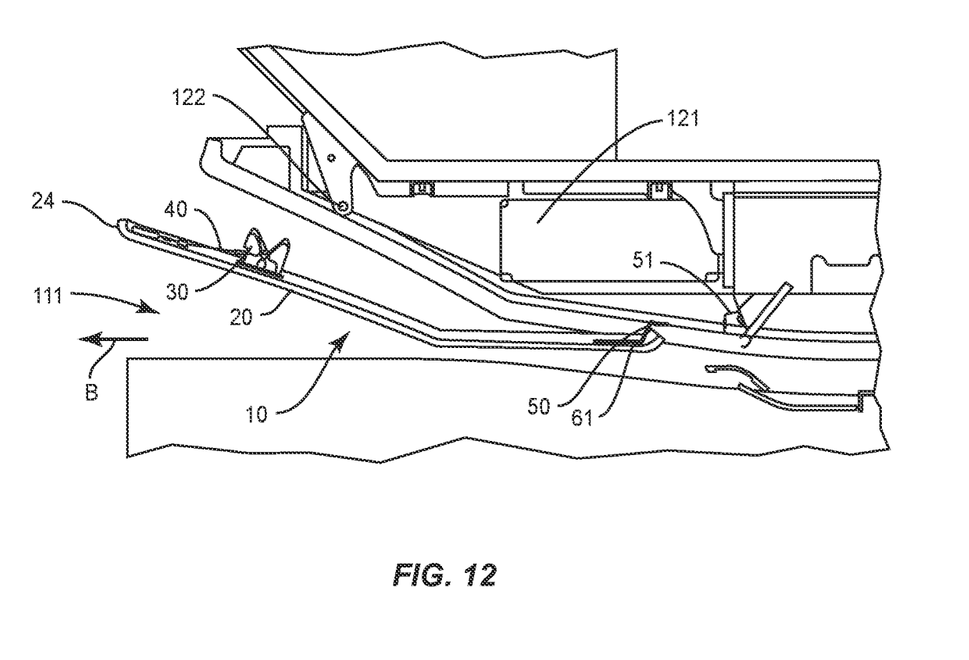
FIG. 12 is a side view of the panel of FIG. 11 in a fully disconnected orientation.

FIGS. 10-12 illustrate an example of the panel 20 being disconnected from the support structure 121 while positioned above a monument wall 105. FIG. 10 illustrates the panel 20 fully connected to the support structure 121. This includes each of the one or more latches 30 connected to a corresponding strike member 122. This also includes the one or more translating hinges 50 engaged with the mating and hinge brackets 51, 61 mated together. This includes the neck 63 extending through the opening 52 in the mating bracket 51. In one example, the angle of the panel 20 relative to the support structure 121 causes the neck 63 of the hinge bracket 61 to apply a force against the side of the opening 52. This load prevents and/or reduces rattle that could be caused by relative movement between the mating and hinge brackets 51, 61.

As illustrated in FIGS. 3 and 10 with the panel 20 fully connected to the support structure 121, the panel 20 provides an aesthetically attractive appearance that matches the other features of the interior space 102. As further shown in FIG. 3, the pull member 40 attached to the inward face 21 of the panel 20 is not visible and thus does not detract from the aesthetic nature.

To remove the panel 20 from the support structure 121, the one or more latches 30 are disconnected as illustrated in FIG. 11. In the partially connected orientation as illustrated in FIG. 11, the latch 30 is disconnected from the strike member 122. This configuration provides for the panel 20 to pivot about the translating hinge 50 with the inboard edge 24 moving downward in the direction of arrow A into the access space 111. In one example, the panel 20 pivots in a range of substantially 0°-8°. The panel 20 remains connected to the support structure 121 during the pivoting movement through the translating hinge 50.

In one example as illustrated in FIG. 11, one or more lanyards 123 control an extent of pivoting movement of the panel 20. The one or more lanyards 123 are connected to the support structure 121 and the panel 20 and include a length to provide for a predetermined amount of pivoting movement. The one or more lanyards 123 can also maintain the panel 20 connected to the support structure 121 when the translating hinge 50 is disconnected. The lanyards 123 can prevent the panel 20 from hitting the monument wall 105 underneath the panel 20. The lanyards 123 also protect wiring of electrical components that are attached to the panel 20. The wires of the components include a longer pig tail connection that is longer than the lanyard 123. When the lanyard 123 is extended, the lanyard 123 carries the weight/force of the panel 20 without putting stress/strain on the wiring and connectors etc.

FIG. 12 illustrates the panel 20 fully disconnected from the support structure 121. The panel 20 has been translated in the direction of arrow B in the access space 111 and away from the overhead storage structure 121. This movement causes the mating bracket 51 to disconnect from the hinge bracket 61, and specifically for the neck 63 of the hinge bracket 61 to move out of the opening 52 in the mating bracket 51. This releases the panel 20 from the translating hinge 50 and provides for a user to remove the panel 20 from the access space 111. In one example, the lanyard 123 is removed from one or both of the panel 20 and support structure 121 to allow for the panel 20 to be fully removed from the access space 111.

As illustrated in FIGS. 10-12, the panel 20 remains in the access space 111 during the removal from the support structure 121. The panel 20 remains away from and out of contact with the monument wall 105. In one example, the translating hinge 50 is configured for the panel 20 to pivot about the translating hinge 50 in a range of 0°-10°. In one specific example, the panel 20 pivots a maximum amount of about 8° between the connected and disconnected orientations.

The connection of the panel 20 to the support structure 121 includes basically the reverse steps. The panel 20 is moved into the access space 111. The second section 66 of the neck 63 is inserted into the opening 52 in the mating bracket 51. The neck 63 is moved into the opening 52 an amount until the height of the neck 63 increases to a point that prevents further insertion. In another example, the neck 63 is inserted an amount to align the latch 30 with the strike member 122. The panel 20 is then pivoted about the translating hinge 50 with the inboard edge 24 moving away from the monument wall 105 and towards the support structure 121. The latch 30 then engages with and connects to the strike member 122 to the fully connected orientation.

Figure 13:
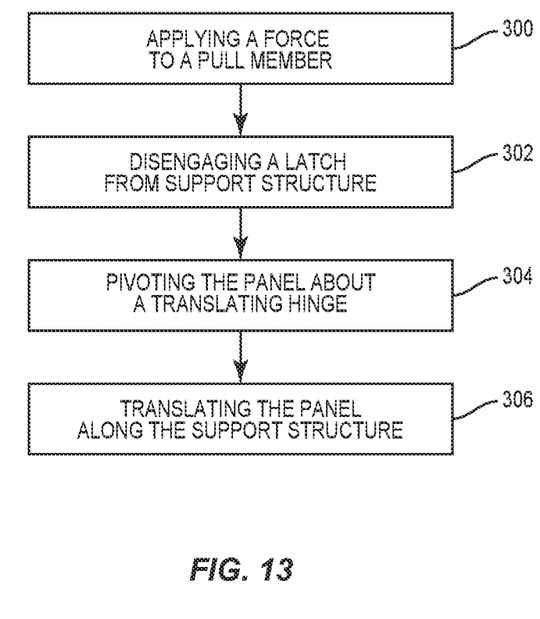
FIG. 13 is a flowchart diagram of a method of removing a panel from an support structure.

FIG. 13 illustrates a flowchart of a method of removing a panel 20 from a support structure 121 within an interior of a vehicle 100. The method includes applying a force to a handle 44 of a pull member 40 that is positioned on an inward face 21 of the panel 20 (block 300). This force is applied while the panel 20 is connected by a latch 30 and a translating hinge 50 to the support structure 121. The force applied to the pull member 40 disengages the latch 30 from the support structure 121 while the panel 20 remains connected to the support structure 121 at the translating hinge 50 (block 302). The method includes pivoting the panel 20 about the translating hinge 50 and moving an inboard edge 24 of the panel 20 downward away from the support structure 121 and towards a monument wall 105 that is positioned in the interior of the vehicle 100 (block 304). After pivoting the panel 20, the panel 20 is translated along the monument wall 105 in a direction towards the interior of the vehicle 100 and away from the support structure 121 (block 306).

An advantage of the assembly 10 is that no tools are required to connect and disconnect the panel 20 from the support structure 121. The one or more pull members 40 are configured to engage and disengage the one or more latches 30. The one or more translating hinges 50 are configured to pivot and translate through the user moving the panel 20 relative to the support structure 121 but without the need for tools.

The assembly 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

In one example as disclosed above, the assembly 10 includes the panel 20, monument wall 105, and one or more latches 30, pull members 40, and translating hinges 50. In another example, the assembly 10 includes the panel 20 and one or more latches 30, pull members 40, and translating hinges 50. In this example, the monument wall 105 is not a part of the assembly 10.

In one example, the pull member 40 is positioned on the panel 20 to be pulled in a direction away from the translating hinge 50 to release the latch 30. In other examples, the pull member 40 is positioned at different locations on the panel 40 and the pull member 40 is pulled in various directions relative to the translating hinge 50 to release the latch 30.

In one example disclosed above, the latch 30 includes a pair of jaw members 31. Various other types of latches 30 can also be used to secure the panel 20, including but not limited to quarter turn style latches and cred card style latches.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly configured to be mounted within an interior of a vehicle, the assembly comprising:
   a monument wall configured to be mounted in the interior of the vehicle;
   panel configured to attach to a support structure above the monument wall, the panel comprising a first edge and an opposing second edge;
   a latch configured to be mounted to the panel between the first edge and the second edge;
   a pull member attached to the panel and comprising an elongated member attached to the latch and a handle positioned on the elongated member and positioned in proximity to the first edge of the panel;
   a translating hinge configured to be mounted to the second edge of the panel to provide for translating and pivoting movement of the panel within an access space between the monument wall and the panel to connect and disconnect the panel from the support structure; and
   wherein the access space comprises a height measured between the monument wall and the panel, and the panel comprises a height measured between an inboard edge and an outboard edge with the height of the access space smaller than the height of the panel.

2. The assembly of claim 1, wherein the panel comprises an inward face and an outward face with the latch, the pull member, and the translating hinge positioned on the inward face.

3. The assembly of claim 1, wherein the pull member is movable relative to the latch to move the latch from an engaged position that is secured to the support structure and a released position that is released from the support structure.

4. The assembly of claim 1, wherein the handle of the pull member is positioned within an envelope defined by a perimeter edge of the panel.

5. The assembly of claim 1, wherein the translating hinge comprises:
a mating bracket configured to mount to the support structure, the mating bracket comprising a slot; and
a hinge bracket comprising a base configured to mount to the inward face of the panel and a neck that is spaced away from the base and configured to fit into the slot to provide for the translating and pivoting movement of the panel relative to the support structure.

6. The assembly of claim 5, further comprising:
the mating bracket comprising a pair of extensions that are separated by a receptacle; and
the hinge bracket is configured to fit into the receptacle when the neck is fit into the slot.

7. The assembly of claim 1, wherein the translating hinge is configured to pivot within a range of between 0°-10°.

8. The assembly of claim 1, wherein the height of the access space is less than one-half the height of the panel.

9. An assembly configured to be mounted within an interior of a vehicle, the assembly comprising:
a monument wall configured to be mounted in the interior of the vehicle;
a panel comprising an inward face configured to face into the support structure and an opposing outward face configured to face into the interior of the vehicle, the panel further comprising a perimeter edge that extends between the inward and outward faces;
a latch configured to be mounted to the inward face and spaced inward from the perimeter edge;
a pull member positioned on the inward face and comprising an elongated shape with a first end attached to the latch and a second end positioned at the perimeter edge of the panel; and
a translating hinge comprising:
a mating bracket configured to mount to the support structure of the vehicle, the mating bracket comprising a body with an opening and a pair of extensions that extend outward from the body adjacent to the opening, the pair of extensions being spaced apart and form a receptacle;
a hinge bracket comprising a base configured to mount to the inward face of the panel, an intermediate section connected to the base and that extends outward from the base, and a neck connected to the intermediate section and that is spaced away from the base;
wherein the intermediate section is configured to fit into the receptacle between the pair of extensions; and
wherein the neck is configured to fit into the opening to provide for translational and pivoting movement of the panel within an access space formed between the monument wall and the panel.

10. The assembly of claim 9, wherein the neck comprises an exposed distal end and with the neck comprising a width that is less than a width of the slot to provide for the neck to fit into the slot and with the distal end positioned within the mating bracket.

11. The assembly of claim 10, wherein the translating hinge is configured to pivot within a range of between 0°-10° to maintain the outer face facing towards the monument wall during movement of the panel.

12. The assembly of claim 10, wherein the mating bracket is a first mating bracket and the hinge bracket is a first hinge bracket and further comprising a second mating bracket and a second hinge bracket wherein the first mating bracket and the first hinge bracket are positioned at a first lateral side of the panel and the second mating bracket and the second hinge bracket are positioned at a second lateral side of the panel.

13. The assembly of claim 9, wherein the second end of the pull member is positioned along an inboard edge of the panel and the hinge bracket is positioned along an opposing outboard edge of the panel.

14. The assembly of claim 9, wherein the access space comprises a height measured between the monument wall and the panel that is less than one-half a height of the panel measured between inboard and outboard edges.

15. The assembly of claim 9, wherein the intermediate section is configured to fit into the receptacle between the pair of extensions to provide forward/aft support and for the extensions to provide a structural load path.

16. A method of removing a panel from a support structure within an interior of a vehicle, the method comprising:
applying a force to a handle of a pull member that is positioned on an inward face of the panel while the panel is connected by a latch and a translating hinge to the support structure;
disengaging the latch from the support structure in response to applying the force to the handle and while the panel remains connected to the support structure at the translating hinge;
pivoting the panel about the translating hinge and moving a first edge of the panel downward away from the support structure and towards a monument wall that is positioned in the interior of the vehicle;
pivoting the panel about the translating hinge while a hinge bracket that is mounted to one of the panel and the support structure and is inserted within a mating bracket that is mounted to the other of the panel and the support structure;
pivoting the panel about a second edge within a range of between 0°-10° and maintaining the panel spaced away from the monument wall;
after pivoting the panel, translating the panel along the monument wall in a direction towards the interior of the vehicle and away from the support structure.

17. The method of claim 16, further comprising pivoting the panel about the translating hinge that is positioned at a second edge of the panel.

18. The method of claim 16, further comprising translating the panel into the interior of the vehicle and disengaging a hinge bracket that is mounted to the panel from a mating bracket that is mounted to the support structure.

19. The method of claim 16, further comprising while the latch is disengaged from the support structure and the panel remains attached with the translating hinge to the support structure, moving the panel away from the support structure and accessing an overhead storage space formed within an interior of the support structure.

20. The method of claim 16, wherein applying the force to the handle of the pull member comprises pulling the handle in a direction away from the translating hinge.

\* \* \* \* \*